United States Patent [19]

Iwama et al.

[11] 4,240,914
[45] Dec. 23, 1980

[54] SELECTIVE PERMEABLE MEMBRANE AND PROCESS FOR PREPARING THE SAME

[75] Inventors: Akio Iwama; Yasuo Kihara; Masao Abe, all of Ibaragi, Japan

[73] Assignee: Nitto Electric Industrial Co., Ltd., Ibaragi, Japan

[21] Appl. No.: 961,168

[22] Filed: Nov. 16, 1978

[30] Foreign Application Priority Data

Nov. 18, 1977 [JP] Japan ................... 52-139383

[51] Int. Cl.³ .................. B01D 31/00; B32B 5/18
[52] U.S. Cl. ..................... 210/500.2; 264/41; 428/304; 428/305; 428/320; 428/321; 428/473.5; 521/27
[58] Field of Search ............ 428/304, 473, 473.5, 428/305, 320, 321; 210/500 M; 427/246; 264/41; 521/27

[56] References Cited

U.S. PATENT DOCUMENTS

| | | | |
|---|---|---|---|
| 3,816,303 | 6/1974 | Wrasidlo | 210/500 M |
| 3,925,211 | 12/1975 | Schumann | 210/500 M |
| 4,061,821 | 12/1977 | Hayano et al. | 428/304 |
| 4,113,628 | 9/1978 | Alegranti | 210/500 M |

Primary Examiner—Ellis P. Robinson
Attorney, Agent, or Firm—Sughrue, Rothwell, Mion, Zinn and Macpeak

[57] ABSTRACT

A selective permeable membrane having self-supporting property which comprises a polyimide polymer consisting essentially of a repeating unit of the formula:

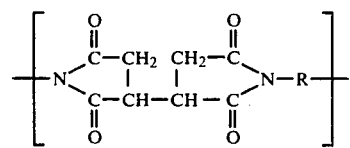

wherein R is a divalent organic group, and a process for preparing the same.

11 Claims, 1 Drawing Figure

1- SKIN LAYER
2- POROUS LAYER

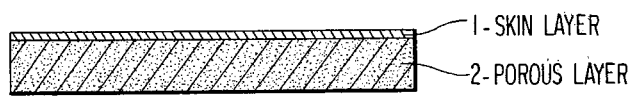

SELECTIVE PERMEABLE MEMBRANE AND PROCESS FOR PREPARING THE SAME

BACKGROUND OF THE INVENTION

1. Field of the Invention

This invention relates to selective permeable membranes, such as are used in reverse osmosis and ultrafiltration, having the ability to selectively separate a solvent from liquid mixtures such as solutions, emulsions and suspensions and a process for preparing the same.

2. Description of the Prior Art

Typical examples of a selective permeable membranes which are only permeable to a specific component of a solution or emulsion are reverse osmosis membranes and ultrafiltration membranes. The reverse osmosis membranes capable of separating a solvent from a solution containing substances of a relatively small particle size or substances of a low molecular size such as sodium chloride are useful in treating waste water from plants, purifying sewage and in the desalination of sea water and brine.

The ultrafiltration membranes, on the other hand, are capable of separating the solvent or dispersion medium from a solution or emulsion containing substances of a relatively large molecular or particle size such as colloids, proteins or microorganisms, and polymers and are used in the purification and concentration steps involved in the manufacture of foods and medicines as well as in the brewing and fermentation industries.

Heretofore, selective permeable membranes of this type have been made from cellulose acetates, polyamides, polysulfones, etc.

However, the selective permeable membranes made from cellulose acetates and polyamides exhibit not only low heat resistance but also poor chemical resistance, such as to strong alkaline or acidic substances making up the liquid mixtures treated by the membrane.

The permeable membranes made from polysulfones are more heat resistant and chemical resistant than those made from cellulose and polyamide but they are poorly resistant to organic solvents.

An attempt has recently been made to make a selective permeable membrane using an aromatic polyimide composed of an aromatic tetracarboxylic acid and diamine, but the manufacture requires converting the amide acid moiety in the molecular skeleton of the resulting selective permeable membrane to an imide ring at a high temperature and this additional step gives a product of low permeability.

SUMMARY OF THE INVENTION

As a result of various studies in search of a selective permeable membrane free from the defects of the conventional products, it has been found that a selective permeable membrane comprising a specific polyimide exhibits high selectivity.

Accordingly, one object of this invention is to provide a selective permeable membrane having self-supporting property which comprises a polyimide polymer consisting essentially of a repeating unit of the formula:

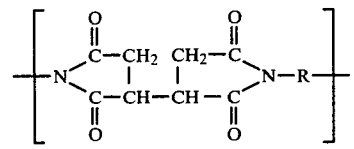

wherein R is a divalent organic group. The above polyimide is a homopolymer when the repeating units contain the same R group and a copolymer when the repeating units contain different R groups.

Another object of this invention is to provide a process for preparing such a selective permeable membrane.

BRIEF DESCRIPTION OF THE DRAWING

The Figure is a cross-sectional view of an anisotropic membrane according to this invention.

DETAILED DESCRIPTION OF THE INVENTION

The selective permeable membrane of this invention is prepared by forming a polyimide polymer consisting essentially of a repeating unit of the formula:

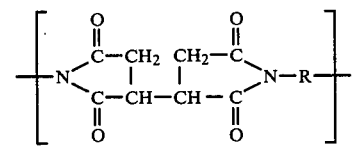

wherein R is a divalent organic group, into a membrane or film exhibiting high selectivity.

The polyimide polymer of the above formula which is used in this invention is based on an aliphatic tetracarboxylic acid, and is generally prepared by dehydrocondensing 1,2,3,4-butanetetracarboxylic acid (hereinafter referred to as "BTC", for simplicity) of the formula

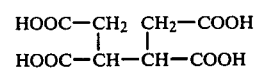

and a diamine of the general formula $H_2N-R-NH_2$, wherein R is defined as above in substantially equimolar amounts at about 100° to 300° C. for about 10 to 50 hours.

In order to obtain a uniform reaction, the condensation is generally carried out in an organic solvent (a reaction solvent) which is typically an N-alkyl pyrrolidone such as N-methyl-2-pyrrolidone, dimethyl acetoamide, an N-alkyl piperidone, dimethyl formamide, dihydroxybenzene, phenols (such as phenol, cresol). Such organic solvents may be used in an amount sufficient to provide a uniform reaction, normally in an amount of about 60 to 900 parts by weight per 100 parts by weight of the sum of BTC and the diamine.

Preferred reaction solvents which can be used in this invention are N-alkyl pyrrolidones such as N-methyl-2-pyrrolidone and N-alkyl piperidone. They permit reactions at high temperature since they have high boiling points and are highly soluble in BTC, diamine and the resulting polyimide polymer. The polyimide polymer thus prepared has self-supporting property, that is the ability to form a membrane or film.

The polyimide polymer used in this invention has an inherent viscosity (measured at 30° C. in N-methyl-2-pyrrolidone) of about 0.55 to 1.2, preferably about 0.60 to 1.00. Too low an inherent viscosity does not provide a selective permeable membrane having high self-supporting property. Too high an inherent viscosity, on the other hand, makes it difficult to prepare a homogeneous film making liquor (called a "dope").

The polyimide polymer used in this invention has a number average molecular weight ranging from about 20,000 to 120,000, preferably from about 30,000 to 80,000, which can be calculated from the above inherent viscosity. The polyimide polymer of the formula defined above generally has about 60 to 300, and preferably about 90 to 200, repeating units of the above formula whose number can also be calculated from the inherent viscosity.

If BTC and diamine are reacted at a temperature of about 100° to 300° C., the linking groups are substantially composed of imide rings, but at about 30° to 80° C., amide bonds as well as imide rings are formed as linking groups.

The preferred polyimide polymer is essentially free of amide bonds, and it is most preferred that all or substantially all of the linking groups are composed of imide rings. The presence of some amide bonds is permissible in the polyimide polymer of this invention as long as the percentage of the conversion to imide (calculated as:

$$\frac{\text{number of imide rings}}{\text{number of imide rings + number of amide bonds}} \times 100)$$

is at least about 70%, preferably at least about 90%, and most preferably from about 98 to 100%. Too low a percentage of conversion to imide produces a selective permeable membrane which has low heat and chemical resistance.

The above explanation is given with respect to the use of BTC but BTC imide-forming derivatives may also be used in this invention. Typical examples of suitable BTC imide-forming derivative are BTC monoanhydride, BTC dianhydride, BTC lower alkyl esters such as BTC dimethyl ester, and BTC amide.

The diamine which is used in the preparation of the polyimide polymer is a compound of the general formula

H₂N—R—NH₂ wherein R is a divalent aromatic group, a divalent group where at least two aromatic groups are linked with a divalent group, a divalent aliphatic group, a divalent group where at least two aliphatic groups are linked with a divalent group, a divalent alicyclic group, or a divalent group where at least two alicyclic groups are linked with a divalent group.

Suitable examples of the divalent aromatic group are

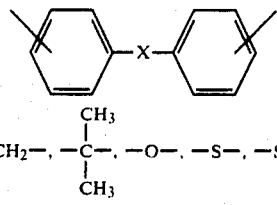
and
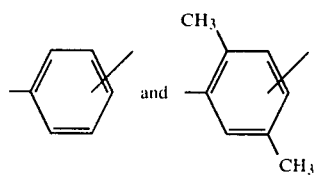

Suitable examples of the divalent group where at least two aromatic groups are linked with a divalent group are

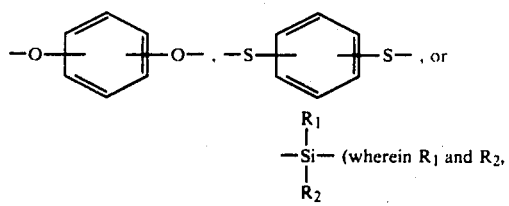

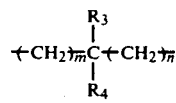

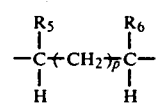

which may be the same or different, each represents a straight or branched alkyl group having 1 to 10 carbon atoms or an cycloalkyl group having 3 to 10 carbon atoms).

Suitable examples of the divalent aliphatic group are

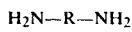

wherein $R_3$ is hydrogen atom, an alkyl group having 1 to 3 carbon atoms or an alkoxy group having 1 to 3 carbon atoms, $R_4$ is hydrogen atom or an alkyl group having 1 to 4 carbon atoms, and m and n are an integer of 1 to 6, and

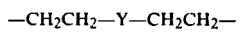

wherein $R_5$ is an alkyl group having 1 to 3 carbon atoms, $R_6$ is hydrogen atom or an alkyl group having 1 to 3 carbon atoms, and p is an integer of 1 to 10.

Suitable examples of the divalent group where at least two aliphatic groups are linked with a divalent group are

—CH₂CH₂—Y—CH₂CH₂— wherein Y is —O— or —S—, and

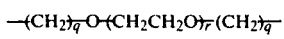

wherein q is an integer of 1 to 5 and r is an integer of 1 to 3.

Suitable examples of the divalent alicyclic group are

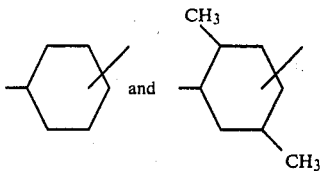

and

Suitable examples of the divalent group where at least two alicyclic groups are linked with a divalent group are

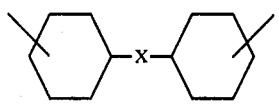

wherein X is defined as above.

Specific examples of suitable diamines are metaphenylenediamine, paraphenylenediamine, 4,4'-diaminodiphenylmethane, 4,4'-diaminodiphenylpropane, 4,4'-diaminodiphenyl ether, 3,4'-diaminodiphenyl ether, 4,4'-diaminodiphenyl sulfide, 4,4'-diaminodiphenyl sulfone, 3,3'-diaminodiphenyl sulfone, para-bis(4-aminophenoxy)benzene, meta-bis(4-aminophenoxy)-benzene, metaxylylene diamine, paraxylylene diamine, di(para-amino-cyclohexyl)methane, hexamethylenediamine, heptamethylenediamine, octamethylenediamine, 1,4-diamino-cyclohexane, bis-(4-aminophenyl)phosphine oxide, bis(4-aminophenyl)diethyl silane, bis(4-aminophenyl)dicyclohexyl silane, 4,4'-dimethylheptadiamine, 3-methoxyheptanemethylene diamine, 2,11-diaminododecane, 4,4'-diaminodicyclohexyl ether; these diamines can be used individually or in admixture.

Diamines which can advantageously be used in this invention are those wherein R is an organic group having an aromatic ring or containing at least one hydrophilic group such as —O—, —SO$_2$—, and —CO—. Diamines wherein R has both an aromatic ring and hydrophilic group are used most advantageously.

Using a diamine where R is an organic group containing an aromatic ring provides a selective permeable membrane exhibiting high selectivity at high temperatures, whereas using a diamine wherein R is an organic group containing a hydrophilic group provides a membrane which solvents or dispersion media can permeate at a high rate.

There is no particular limitation on the method which is used to form the polyimide polymer thus prepared into a selective permeable membrane intended for this invention. Any known film making method can be used, but the selective permeable membrane of this invention is most advantageously produced by a novel method which will be described hereinafter and constitutes another aspect of this invention.

Accordingly, the present invention also provides a process for preparing a selective premeable membrane which comprises dissolving the above described polyimide polymer in an organic solvent (the dope solvent) having high miscibility with water to prepare a polyimide polymer solution (hereinafter referred to as the "dope"), flow coating the dope onto a suitable supporting substrate such as a glass sheet, a glass tube, a metal sheet (such as stainless steel, aluminum, etc.), a metal tube, a sheet-like fibrous substrate such as a woven or unwoven cloth, or a woven or unwoven tubular member in a certain thickness, immersing the dope coated substrate in another organic solvent (hereinafter referred to as "immersing solvent", for simplicity) in which the polymer is sparingly soluble but which is highly miscible with the organic solvent (dope solvent) as well as with water for a short period of time and then coagulating the polymer in water. In summary, the process of this invention comprises coating a supporting substrate having a smooth surface with the dope in a certain thickness, immersing the dope coated substrate in the immersing solvent for a short period of time, and coagulating the polymer in water. For a definition of coagulating see Strathmann et al, *Desalination*, 16, p.179 (1975).

The term "organic solvent (dope solvent) having high miscibility with water" as used herein refers to an organic solvent having an ability that the dope solvent can be substantially completely replaced with water when the polymer is coagulated in water according to the above described film making method. That is to say that the dope solvent is miscible with water such that it diffuses from the polyimide polymer solution (the dope) when the dope is immersed in water thereby causing the polymer to coagulate.

Naturally the dope solvent must be capable of dissolving the polyimide polymer.

Examples of the dope solvent which can be used in this invention include N-alkyl-2-pyrrolidones such as N-methyl-2-pyrrolidone or N-ethyl-2-pyrrolidone, N-alkyl-2-piperidones such as N-methyl-2-piperidone, dimethyl acetoamide, dimethyl formamide and mixtures thereof. Particularly preferred for use in the present invention is N-methyl-2-pyrrolidone.

The dope from which the selective permeable membrane is prepared according to the above described process of this invention requires an organic solvent (dope solvent) which, as stated hereinabove, is highly miscible and, preferably completely miscible (i.e., miscible in any amount) with water. It is advantageous to use a highly water-miscible organic solvent as the reaction solvent for preparing the polyimide polymer, because, by so doing, the resulting solution of polyimide polymer in the reaction solvent can be used as the dope either immediately or after suitable dilution or concentration. The reaction solvent which is most suitable for this purpose is N-methyl-2-pyrrolidone.

According to the above described process for preparing a selective permeable membrane from the polyimide polymer, the dope concentration (solid content of the dope)is normally from about 5 to 30 wt%, preferably from about 15 to 25 wt%. If the dope concentration is less than about 5 wt%, the resulting selective permeable membrane exhibits poor selectivity, whereas if the dope concentration exceeds about 30 wt%, the dope is so viscous that the rate at which the solvent or dispersion medium can permeate the resulting selective permeable membrane is reduced. According to this invention, the dope is coated on the supporting substrate at a viscosity (measured by Brookfield viscometer at 30° C.) which is generally from about 10 to 1,000 poises, preferably about 50 to 300 poises, and more preferably about 100 to 200 poises.

To coat the substrate with a high viscosity dope, the method disclosed in Japanese Patent Application No. 10697/75 entitled "Process For Preparing Tubular Semipermeable Membrane" or a mechanical extrusion coating method may preferably be used. The substrate is generally coated with the dope at room temperature.

Examples of the supporting substrate having a smooth surface are sheets or tubes of inorganic materials such as glass, widely used metals, such as stainless steel and aluminum, and solid plastics such as polyethylene and polypropylene, etc.

The thickness of the dope with which the supporting material is coated varies depending on the purpose for which the resulting selective permeable membrane is used. The thickness is controlled such that the selective permeable membrane obtained generally has a thickness of about 50 to 400μ, preferably about 150 to 250μ. If the coating is too thin, the resulting permeable membrane has poor strength in use. If the coating is too thick, the resulting membrane may have satisfactory selectivity, but the permeation rate of the membrane may be slow and the film making procedure will taken too much time.

The thickness of the resulting selective permeable membrane is generally determined by the coating thickness of the dope, but this does not apply in all cases because given the same dope coating thickness, the higher the polyimide polymer concentration in the dope, the thicker is the membrane. To take an example, given a dope having a coating thickness of about 250μ, use of a dope having the polyimide polymer content of 25 wt% provides a selective permeable membrane about 170μ thick, whereas use of a dope having a polyimide polymer content of 15 wt% gives a membrane thickness of about 130μ.

The dope coated supporting substrate thus prepared is then immersed in the immersing solvent for a short period of time. As pointed out above, one requirement for the immersing solvent is that it sparingly dissolves the polyimide polymer. It is preferable that the polymer be completely insoluble in the immersing solvent or only swell therein.

By the term "another organic solvent (immersing solvent) having high miscibility with dope solvent and water" is meant an organic solvent which, when the supporting substrate is coated with the dope is immersed in the immersing solvent, is capable of replacing the dope solvent on the surface of the dope, and which, when the polymer is coagulated in water in the final stage of film making procedure, has the function of being replaced by water substantially completely or preferably completely. As advantageous immersing solvent for the purpose of this invention is an organic solvent which is completely miscible with dope solvent and water.

In accordance with this invention the step of immersion in the immersing solvent is responsible for forming the skin layer shown in the figure. Upon immersion in the immersing solvent the dope solvent diffuses into the immersing solvent from the surface portion of the coated dope causing coagulation of the polymer at the surface to occur. Thus, in order to form the skin layer on the surface of the coated dope, the immersing solvent must be miscible with the dope solvent but the polymer must be insoluble or only swollen therein as explained above. Also, the immersion treatment time is relatively short and cannot be so long as to cause the dope to become dense throughout.

For practical application, the dope supporting substrate is immersed in the immersing solvent within about 5 minutes of its preparation, and it may be left standing about 1 to about 2 hours before immersion. However, an extremely long period of standing prior to immersion does not produce the desired selective permeable membrane of this invention. In general, the dope coated supporting substrate should be placed in the immersing solvent before the surface of the dope loses transparency and becomes white-turbid.

The time for which the dope coated supporting substrate is immersed in the immersing solvent varies depending on the kind of immersing solvent and the immersion temperature employed, but it normally ranges from about 0.5 to 600 seconds, preferably about 1 to 60 seconds. If the time is too short, the resulting selective permeable membrane, when used as a reverse osmosis membrane or ultrafiltration membrane, exhibits poor selectivity, and if it is too long, the rate at which the solvent or dispersion medium permeates the resulting membrane is low.

The substrate is immersed in the immersing solvent at a temperature lower than the boiling point of the solvent and therefore the immersion temperature varies depending with the immersing solvent, but it is normally from about 0° to 150° C., preferably about 10° to 80° C.

The immersing solvent that can be used in this invention should satisfy the above described conditions, and depends on the kind of dope solvent. Typical examples of the immersing solvent are methyl alcohol, ethyl alcohol, isopropyl alcohol, tertiary butyl alcohol, ethylene glycol, propylene glycol, glycerin, acetone, tetrahydrofuran, dioxane, methyl cellosolve, ethyl cellosolve, and mixtures thereof.

If the dope solvent is, for example, N-methyl-2-pyrrolidone, the immersing solvent is preferably tetrahydrofuran, tertiary butyl alcohol or ethylene glycol.

The dope coated supporting substrate is taken out of the immersing solvent and placed in water where the polyimide polymer is coagulated into a selective permeable membrane useful as a membrane for reverse osmosis or ultrafiltration. A supporting substrate in the form of a sheet having a smooth surface provides a sheet-like membrane whereas a supporting substrate in tubular form having a smooth surface provides a tubular membrane.

Once the dope coated supporting substrate is removed from the immersing solvent it should not be left standing excessively long before it is immersed in water for coagulation because the rate at which a solvent or dispersion medium permeates the resulting selective permeable membrane may be reduced if it is allowed to stand too long. Therefore, the time between recovery of the substrate from the immersing solvent and immersion in water such that it provides a practically effective selective permeable membrane, is generally within 5 minutes, preferably within 1 minute, and most preferably, the substrate is put into water as soon as it is taken out of the immersing solvent.

There is no particular limitation on the temperature at which coagulation takes place in water, and it is generally lower than the boiling point of water, generally from about above 0° to 80° C., and preferably from about above 0° to 50° C. (above 0° meaning the water is not solid). The time required for coagulation depends on the coagulation temperature, and is generally from about 1 to 5 hours.

The selective permeable membrane thus obtained can be stored in water without being recovered from it; in this case, the storage is continuous and inseparable from the step of coagulation. The selective permeable membrane having been shaped through coagulation in water can easily be separated from the supporting substrate having a smooth surface.

The selective permeable membrane prepared by the method described above is a so called an "anisotropic membrane".

According to the process of this invention wherein the dope coated substrate is immersed in the immersing solvent for a short period, it is believed that a thin dense layer which will ultimately form skin layer is formed on the face of the dope in contact with the immersing solvent (opposite to the face of the dope in contact with the supporting substrate), and by coagulation in water of the dope provided with the skin layer, the dope layer other than the skin layer becomes porous to thereby provide an anisotropic membrane.

Therefore, the selective permeable membrane prepared by the above described method comprises a skin layer (1) on one surface of a porous layer (2), as shown in the accompanying drawing. A membrane of such structure is generally referred to as "an anisotropic membrane". The pore size of the skin layer does not exceed the pore size of the porous layer. The skin layer provides the membrane with the ability to perform reverse osmosis or ultrafiltration. The porous layer enables the solvent or dispersion medium to pass out of the membrane after passage through the skin layer.

According to this invention, the resulting selective permeable membrane may be optionally heated at about 100° to 400° C. for about 5 seconds to about 30 minutes, typically about 30 seconds to about 10 minutes, to increase its mechanical strength at high temperatures. The heating time varies with temperature; heating may continue for about 20 to 25 minutes at 100° C. and only for a few seconds to several tens of seconds at 350° C.

Such are the characteristics of the selective permeable membrane prepared by the process of this invention that it exhibits not only high heat resistance, high selectivity, high chemical resistance and high mechanical strength but it allows a solvent or dispersion medium to penetrate through it at a high rate. What is more, the membrane withstands extended use without suffering mechanical damage or deteriorated performance due to chemical change in the membrane and it may be used over a wide pH range.

Accordingly, the selective permeable membrane of this invention can advantageously be used for desalination of sea water and brine, the treatment of sewage, as well as for the purification and concentration involved in the food and fermentation industries.

The process of this invention can be put into practice with some modifications. For instance, to improve the mechanical strength of the selective permeable membrane, the dope may be mixed with a self-supporting material which is compatible with it, such as a polysulfone (Polysulfone P-1700, P-3500, products of Union Carbide, etc.) or polyphenylene oxide (PPO-534, a product of General Electric, etc.) before the selective permeable membrane is prepared from the dope by repeating the procedure described herein. The self-supporting material compatible with the dope may be used in an amount of about 20 parts by weight or less, preferably 5 parts by weight or less, per 100 parts by weight of the polyimide polymer of which the dope is composed. If more than 20 parts by weight of the material is used, a homogeneous dope cannot be obtained. If the dope contains such self-supporting material, the concentration of dope should be adjusted such that it is generally from about 5 to 30 wt% (solid content) as specified herein, including the supporting material.

Alternatively, the dope may be mixed with chlorides, nitrates or sulfates, etc. of an alkali metals or alkaline earth metals which are used independently or as a mixture to increase the rate at which the solvent or dispersion medium permeates the resulting selective permeable membrane. Typical examples of these salts include lithium nitrate, potassium nitrate, lithium chloride, potassium chloride, calcium chloride, calcium nitrate, magnesium sulfate, etc. These salts must of course be such that they are soluble in water, dope solvent and immersing solvent.

The amount of the salts to be mixed with the dope depend on the concentration of dope and the kind of dope solvent, but is not subject to any particular limitation as long as the salts can be uniformly dissolved in the dope. Typically, the salts are added to the dope in an amount of 100 parts by weight or less, preferably in the range from about 1 to 20 parts by weight, per 100 parts by weight of the polyimide polymer of which the dope is composed. Use of too much salt has a tendency to give a less homogeneous dope. The salts described above may be added to the dope in solid form, or uniformly dissolved in the dope by suitable means such as stirring, or they may be first dissolved in the dope solvent.

The process described herein is advantageous for preparing a reverse osmosis and ultrafiltration membranes from the polyimide polymer.

Alternatively, the step of immersing the dope coated supporting substrate in the immersing solvent may be eliminated, and the dope is given a shape by coagulation in water, either immediately or after heating the dope coated substrate at about 80° to 300° C. for about 5 seconds to 30 minutes. The resulting membrane is advantageous for ultrafiltration membrane or microfiltration membrane.

The process described hereinabove relates to a technique of preparing a sheet or tube of selective permeable membrane without any reinforcement, but it will be readily apparent to those skilled in the art that such a modification is possible. A supporting fibrous substrate in sheet form made of woven cloth of organic fibers such as polyester fibers and acryl fibers or inorganic fibers such as glass fibers may be coated with the dope by suitable means such as roll coating, spraying or immersion, and the dope may be shaped into a film by a wet method, dry method or a combination of two methods. By this process, a selective permeable membrane reinforced with the fibrous substrate in sheet form is produced. One example of this modified process is disclosed in Japanese Patent Application No. 124,771 (filed Oct. 17, 1977 entitled "Process for Preparing Selective Permeable Membrane").

As a further modification of the process of this invention, the dope may be extruded from a hollow spinneret into water or the like to thereby produce a selective permeable membrane in the form of hollow filaments.

The invention will now be described in greater detail by reference to the following examples. In the examples, the following formulae are used to calculate the desalination efficiency and the water permeating rate, which are commonly used to evaluate the performance of a selective permeable membrane.

Desalination efficiency =

$$\text{Water permeating rate} = \frac{\left(1 - \frac{\text{concentration of permeate (\% by weight)}}{\text{concentration of feed solution (\% by weight)}}\right) \times 100 \, (\%)}{\text{effective area of selective permeable membrane } (m^2) \times \text{processing time (day)}}$$

Both desalination efficiency and water permeating rate are determined at 25° C.

SYNTHESIS EXAMPLE 1

Preparation of polyimide polymer I

A 20 l reactor equipped with a stirrer, an inlet for nitrogen gas, a reflux column equipped with a device for draining reaction water and a water jacket that can be heated up to 250° C. was charged with 14.8 kg of N-methyl-2-pyrrolidone (hereunder referred to as NMP), 2.81 kg of BTC and 2.40 kg of 4,4'-diaminodiphenyl ether, and heated to about 70° C. to obtain a homogeneous solution.

The homogeneous reaction system obtained was mixed with 1.7 kg of xylene as an azeotropic solvent, heated to 175° to 195° C. under a nitrogen flow. Then under a reflux of xylene the reaction water was distilled off by azeotropic distillation and continuously drained to thereby perform the imide forming reaction.

As the reaction proceeded, the viscosity of the reaction system increased with the result that 860 g of water was distilled off in about 35 hours. After the reaction, the xylene was removed to obtain a solution of a polyimide polymer in NMP having a solid (polymer) content of 25% and a viscosity of 180 poises (measured with a B-type viscometer at 30° C.).

The polyimide polymer obtained had an inherent viscosity [$\eta$] of 0.76 at 30° C. NMR and IR spectra showed that the degree of conversion to imide in the polyimide polymer was not lower than 99%.

SYNTHESIS EXAMPLE 2

Preparation of polyimide polymer II

The procedure of Experiment No. 1 was repeated using 1.50 kg of BTC, 1.27 kg of diaminodiphenylmethane and 12.8 kg of NMP. A solution of polyimide polymer in NMP having a solid base content of 18% and a viscosity of 57 poises (measured with a B-type viscometer at 30° C.) was obtained.

The polyimide polymer had an inherent viscosity [$\eta$] of 0.58 at 30° C. NMR and IR specta showed that the degree of conversion to imide in the polyimide polymer was not lower than 99%.

SYNTHESIS EXAMPLE 3

Preparation of dope I 10 parts by weight of lithium nitrate finely ground in a mortar was dissolved in 100 parts by weight of the solution of polyimide of Synthesis Example 1 with stirring for 5 hours at 100° C. to thereby produce a homogeneous dope.

SYNTHESIS EXAMPLE 4

Preparation of dope II

A dope was prepared by uniformly mixing a 15 wt% solution of potassium nitrate in NMP in an amount corresponding to 5 parts by weight of potassium nitrate with 100 parts by weight of the solution of polyimide polymer obtained in Synthesis Example 2.

SYNTHESIS EXAMPLES 5 to 7

Preparation of dopes

Using the procedure of Synthesis Example 3, dopes were prepared from the components set forth in Table 1 below.

SYNTHESIS EXAMPLES 8 and 9

Preparation of dopes

Using the procedure of Synthesis Example 4, dopes were prepared from the components indicated in Table 1 below.

Table 1

| Synthesis Example | Solution of Polyimide Polymer | Inorganic Salt | Amount of Salt (parts per 100 parts by weight of polymer) |
|---|---|---|---|
| 5 | solution of polyimide polymer prepared in Synthesis Example 1 | potassium chloride | 10 |
| 6 | solution of polyimide polymer prepared in Synthesis Example 1 | lithium nitrate | 100 |
| 7 | solution of polyimide polymer prepared in Synthesis Example 1 | calcium nitrate | 5 |
| 8 | solution of polyimide polymer prepared in Synthesis Example 2 | potassium chloride | 20 |
| 9 | solution of polyimide polymer prepared in Synthesis Example 2 | lithium nitrate | 50 |

EXAMPLE 1

A glass plate substrate was coated with a 275$\mu$ thick dope composed of the solution of polyimide polymer obtained in Synthesis Example 1. The substrate was immediately immersed in tertiary butyl alcohol (immersing solvent) at 25° C. for 10 seconds, and 20 seconds later, placed in a 0° C. water bath for 120 minutes to coagulate the dope. The reverse osmosis membrane obtained had a thickness of 200$\mu$.

The membrane was mounted in a measuring cell of the pressure batch type, and supplied with a 5,000 ppm aqueous solution of sodium chloride to determine its water permeating rate and desalination efficiency at an operating pressure of 42 kg/cm$^2$. The results are shown in Table 4 below.

EXAMPLE 2

The inner surface of a glass tube having an inner diameter of 13.6 mm and a wall thickness of about 3 mm were flow coated with a 270$\mu$ thick dope composed of the solution of polyimide polymer obtained in Synthesis Example 1. The dope coated glass tube was immediately immersed in tertiary butyl alcohol (immersing solvent) at 20° C. for 25 seconds, and 5 seconds later, it was placed in water for 120 minutes to coagulate the dope. A tubular reverse osmosis membrane having an outer diameter of 12.8 mm and a thickness of 200μ was obtained.

The membrane was slipped into a perforated stainless steel tube having an outer diameter of 13.0 mm and a wall thickness of 2 mm, and supplied with a 5,000 ppm solution of sodium chloride at 42 kg/cm² to determine the desalination efficiency and water permeating rate. The results are shown in Table 4 below.

was evaluated in the same manner as used in Example 2. The results are shown in Table 4 below.

EXAMPLES 19 to 20

The procedure of Example 3 was repeated under the conditions specified in Table 2 below. The performance of each of the selective permeable membranes obtained is shown in Table 4 below.

Table 2

| Ex. No. | Time (sec.) from Coating Dope to Immersion | Dope Coating Thickness (μ) | Conditions for Immersion | | | Time (sec.) between Immersion and Coagulation | Coagulation Conditions | | Membrane Thickness (μ) |
|---|---|---|---|---|---|---|---|---|---|
| | | | Immersing Solvent | Immersion Time (sec.) | Immersion Temp. (°C.) | | Temp. (°C.) | Time (min.) | |
| 4 | 30 | 250 | isopropyl alcohol | 5.0 | 20.0 | 2 | 1 | 120 | 149 |
| 5 | 30 | 250 | ethylene glycol | 2.0 | 20.0 | 1 | 1 | 120 | 170 |
| 6 | 30 | 250 | propylene glycol | 2.0 | 20.0 | 2 | 2 | 120 | 151 |
| 7 | 15 | 250 | glycerin | 5.0 | 20.0 | 2 | 2 | 120 | 163 |
| 8 | 15 | 250 | tetra-hydrofuran | 10.0 | 20.0 | 5 | 2 | 120 | 172 |
| 9 | 15 | 250 | tertiary butyl alcohol | 1.0 | 20.0 | 20 | 2 | 120 | 170 |
| 10 | 15 | 250 | tertiary butyl alcohol | 2.0 | 20.0 | 20 | 2 | 120 | 172 |
| 11 | 15 | 250 | tertiary butyl alcohol | 5.0 | 20.0 | 20 | 2 | 120 | 168 |
| 12 | 15 | 250 | tertiary butyl alcohol | 20.0 | 20.0 | 20 | 2 | 120 | 167 |
| 13 | 15 | 250 | ethylene glycol | 15.0 | 50.0 | 20 | 2 | 120 | 129 |
| 14 | 15 | 250 | ethylene glycol | 15.0 | 70.0 | 20 | 2 | 120 | 149 |
| 15 | 15 | 250 | tetra-hydrofuran | 30.0 | 20.0 | 20 | 2 | 120 | 159 |
| 16 | 15 | 250 | tetra-hydrofuran | 5.0 | 20.0 | 10 | 2 | 120 | 169 |
| 17 | 10 | 270 | ethylene glycol | 10.0 | 20.0 | 10 | 2 | 120 | 188 |
| 18 | 10 | 270 | tetra-hydrofuran | 10.0 | 20.0 | 10 | 2 | 120 | 193 |
| 19 | 15 | 250 | ethylene glycol | 10.0 | 20.0 | 10 | 2 | 120 | 147 |
| 20 | 15 | 250 | tetra-hydrofuran | 25.0 | 20.0 | 10 | 2 | 120 | 162 |

EXAMPLE 3

The procedure of Example 1 was repeated except that the dope was composed of the solution of polyimide polymer obtained in Synthesis Example 2. The performance of the selective permeable membrane produced is shown in Table 4 below.

EXAMPLES 4 to 16

The procedures of Example 1 were repeated under the conditions indicated in Table 2 below. The performance of each of the selective permeable membranes obtained is shown in Table 4 below.

EXAMPLES 17 to 18

The procedure of Example 2 was repeated under the conditions set forth in Table 2 below. The performance of each of the selective permeable membranes obtained

EXAMPLE 21

Using the dope prepared in Synthesis Example 3, the procedure of Example 1 was repeated to prepare a reverse osmosis membrane having a thickness of 200μ. Table 4 shows the performance of the membrane.

EXAMPLES 22 to 28

Using the dopes prepared in Synthesis Example 3 to 9, the procedure of Example 1 were repeated under the conditions shown in Table 3 to produce reverse osmosis membranes each having a thickness of 170μ. The performance of each membrane is shown in Table 4 below.

EXAMPLES 29 to 30

Using the dopes prepared in Synthesis Examples 3 and 6, the procedure of Example 2 was repeated under the conditions shown in Table 3 to produce reverse osmosis membranes. The performance of each membrane is shown in Table 4 below.

Table 3

| Ex. No. | Dope (Synthesis Example) | Time (sec.) from Dope Coating to Immersion | Dope Coating Thickness (μ) | Immersing Solvent | Immersion Time (sec.) | Immersion Temp. (°C.) | Time (sec.) between Immersion and Coagulation | Coagulation Temp. (°C.) | Coagulation Time (min.) | Membrane Thickness (μ) |
|---|---|---|---|---|---|---|---|---|---|---|
| 22 | 6 | 10 | 250 | glycerin | 30.0 | 20.0 | 1 | 2 | 120 | 176 |
| 23 | 3 | 10 | 250 | tetrahydrofuran | 10.0 | 20.0 | 2 | 2 | 120 | 174 |
| 24 | 4 | 10 | 250 | tertiary butyl alcohol | 20.0 | 20.0 | 1 | 2 | 120 | 178 |
| 25 | 5 | 10 | 250 | tertiary butyl alcohol | 10.0 | 20.0 | 1 | 2 | 120 | 169 |
| 26 | 7 | 10 | 250 | tetrahydrofuran | 10.0 | 20.0 | 1 | 1 | 120 | 183 |
| 27 | 8 | 10 | 250 | tetrahydrofuran | 10.0 | 20.0 | 1 | 1 | 120 | 167 |
| 28 | 9 | 10 | 250 | ethylene glycol | 10.0 | 20.0 | 1 | 1 | 120 | 179 |
| 29 | 6 | 10 | 270 | tertiary butyl alcohol | 20.0 | 20.0 | 5 | 1 | 120 | 220 |
| 30 | 3 | 10 | 270 | tetrahydrofuran | 10.0 | 20.0 | 5 | 1 | 120 | 200 |

Table 4

| Example No. | Water Permeating Rate (m³/m² day) | Desalination Efficiency (%) | Method of Evaluation of Water Permeating Rate and Desalination Efficiency |
|---|---|---|---|
| 1 | 0.13 | 95.8 | — |
| 2 | 0.41 | 94.0 | — |
| 3 | 0.12 | 84.8 | Comply with Example 1 |
| 4 | 0.14 | 92.6 | " |
| 5 | 0.96 | 93.7 | " |
| 6 | 0.20 | 94.3 | " |
| 7 | 0.12 | 95.5 | " |
| 8 | 0.39 | 98.2 | " |
| 9 | 0.22 | 91.5 | " |
| 10 | 0.17 | 93.7 | " |
| 11 | 0.15 | 95.0 | " |
| 12 | 0.12 | 96.4 | " |
| 13 | 0.58 | 95.2 | " |
| 14 | 0.34 | 89.1 | " |
| 15 | 0.19 | 95.7 | " |
| 16 | 0.46 | 93.2 | Comply with Example 1 |
| 17 | 0.32 | 95.6 | Comply with Example 2 |
| 18 | 0.66 | 92.7 | " |
| 19 | 0.32 | 88.5 | Comply with Example 1 |
| 20 | 0.29 | 92.3 | " |
| 21 | 0.48 | 94.7 | " |
| 22 | 1.37 | 81.0 | " |
| 23 | 0.76 | 97.3 | " |
| 24 | 0.84 | 79.1 | " |
| 25 | 0.42 | 93.3 | " |
| 26 | 0.55 | 80.7 | " |
| 27 | 0.71 | 90.6 | " |
| 28 | 0.99 | 82.8 | " |
| 29 | 1.95 | 86.1 | Comply with Example 2 |
| 30 | 0.88 | 96.0 | " |

EXAMPLE 31

A glass plate was coated with the dope of Synthesis Example 1 to a thickness of 250μ. The dope coated glass plate was immediately immersed in methyl alcohol (immersing solvent) at 20° C. for 2 seconds, and 30 seconds later, placed in a 1° C. water bath for 120 minutes to coagulate the dope. An ultrafiltration membrane having a thickness of 165μ was obtained.

The performance of the membrane is shown in Table 6 below.

EXAMPLE 32

A stainless steel plate was coated with the dope of Synthesis Example 2 to a thickness of 250μ. The dope coated plate was allowed to stand for 10 seconds before it was immersed in methyl alcohol (immersing solvent) at 20° C. for 2 seconds, and 30 seconds later, placed in a 1° C. water bath for 120 minutes to coagulate the dope. An ultrafiltration membrane having a thickness of 163μ was obtained.

The performance of the membrane is shown in Table 6 below.

EXAMPLE 33

A glass plate was coated with the dope of Synthesis Example 3 to a thickness of 250μ. The dope coated plate was immediately immersed in methyl alcohol (immersing solvent) at 20° C. for 2 seconds, and 10 seconds later, placed in a 2° C. water bath for 120 minutes to coagulate the dope. An ultrafiltration membrane having a thickness of 173μ was obtained.

The performance of the membrane is shown in Table 6 below.

EXAMPLES 34 to 36

The procedure of Example 33 was repeated under the conditions specified in Table 5 below. Table 6 shows the performance of the ultrafiltration membrane obtained.

Table 5

| Ex. No. | Dope (Synthesis Example) | Time (sec.) from Coating Dope to Immersion | Dope Coating Thickness ($\mu$) | Conditions for Immersion Immersing Solvent | Immersion Time (sec.) | Immersion Temp. (°C.) | Time (sec.) between Immersion and Coagulation | Coagulation Conditions Temp. (°C.) | Time (min.) | Membrane Thickness ($\mu$) |
|---|---|---|---|---|---|---|---|---|---|---|
| 34 | 6 | 10 | 250 | methyl alcohol | 2 | 20.0 | 30 | 1 | 120 | 173 |
| 35 | 8 | 10 | 250 | methyl alcohol | 2 | 20.0 | 30 | 1 | 120 | 168 |
| 36 | 9 | 10 | 250 | methyl alcohol | 2 | 20.0 | 30 | 1 | 120 | 165 |

EXAMPLE 37

A glass plate was coated with the dope of Synthesis Example 6 to a thickness of 250$\mu$. The dope coated glass plate was heated at 110° C. for 30 seconds and placed in a 0° C. water bath for 2 hours for coagulation of the dope. An ultrafiltration membrane having a thickness of 145$\mu$ was obtained.

The performance of the membrane is shown in Table 6 below.

EXAMPLE 38

The inner surfaces of a glass tube (inner diameter: 13.6 mm, wall thickness: 3 mm) were flow coated with the dope of Synthesis Example 8 to a thickness of 300$\mu$. The dope coated tube was heated for 30 seconds with 130° C. hot air being flown through the tube. Care was used in the heating treatment to maintain a uniform coating thickness of the dope on the tube walls by rotating the tube at 50 rpm.

The dope coated glass tube was then placed in a 1° C. water bath for 120 minutes to coagulate the dope. A tubular ultrafiltration membrane having an outer diameter of 13 mm and a thickness of 200$\mu$ was produced. The performance of the membrane is set forth in Table 6 below.

Table 6

| Example No. | Water Permeating Rate (m$^3$/m$^2$ day) | Elimination Efficiency (%) |
|---|---|---|
| 31 | 0.96 | 94.5 |
| 32 | 1.12 | 90.9 |
| 33 | 1.22 | 93.8 |
| 34 | 1.75 | 81.9 |
| 35 | 0.72 | 89.0 |
| 36 | 0.99 | 85.8 |
| 37 | 0.80 | 95.1 |
| 38 | 1.88 | 94.0 |

The water permeating rate and elimination efficiency in Table 6 for Examples 31 to 38 were determined under the following conditions.

The ultrafiltration membrane obtained was mounted in a measuring cell of pressure batch type and supplied with a 5,000 ppm aqueous solution of polyethylene glycol (average molecular weight: 20,000) to determine the water permeating rate and elimination efficiency at 25° C. using an operating pressure of 4 kg/cm$^2$.

Elimination efficiency =

$$\left(1 - \frac{\text{concentration of polyethylene glycol in permeate}}{\text{concentration of polyethylene glycol in feed solution}}\right) \times 100\ (\%)$$

EXAMPLE 39

An aluminum plate was coated with the dope of Synthesis Example 6 to a thickness of 320$\mu$. The dope coated plate was immediately placed in a 50° C. water bath for coagulation of the dope in 120 minutes. A microfiltration membrane having a thickness of 200$\mu$ was produced.

The membrane was mounted in a measuring cell of the pressure batch type and supplied with a polystyrene emulsion having an average particle size of 0.312$\mu$ (a solid content of 0.002 wt%) and with a polystyrene emulsion having an average particle size of 0.176$\mu$ (a solid content of 0.002 wt.%) each dispersed in water. The elimination efficiency of the particles of each polystyrene emulsion was determined at 20° C. using an operating pressure of 1 kg/cm$^2$.

The elimination efficiency of the 0.312$\mu$ sized emulsion was 99%, whereas that of the 0.176$\mu$ sized emulsion was 3%.

Elimination efficiency was determined using a spectrophotometer ("Photospectrometer 124" manufactured by Hitachi Seisakusho) by measuring the light transmittance of polystyrene emulsion (feed solution) and the permeat using light of a wavelength giving minimum transmittance.

Pure water permeated the microfiltration membrane of Example 39 at 31.8 ml/cm$^2$.min as measured on a measuring cell of vacuum batch type at 25° C. and 45 mmHg.

Following is the calculation formula for water permeating rate:

Water permeating rate =

$$\frac{\text{volume of permeate (ml)}}{\text{effective area of membrane (cm}^2) \times \text{processing time (min)}}$$

EXAMPLE 40

A microfiltration membrane was prepared by repeating the procedure of Example 39 except that coagulation took place in a water bath at a temperature of 80° C. Repeating the procedure of Example 39, the efficiency of eliminating the 0.481$\mu$ and 0.312$\mu$ sized polystyrene emulsions dispersed in water (each having a solid content of 0.002 wt%) was found to be 99% and 5%, respectively. Pure water permeated the microfiltration membrane of Example 40 at 78.3 ml/cm².min as measured by the same method as used in Example 39.

While the invention has been described in detail and with reference to specific embodiments thereof, it will be apparent to one skilled in the art that various changes and modifications can be made therein without departing from the spirit and scope thereof.

What is claimed is:

1. A selective permeable membrane having a self-supporting property, which comprises a polyimide polymer consisting essentially of a repeating unit of the formula:

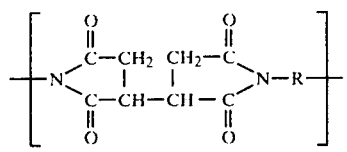

wherein R is a divalent organic group wherein the polyimide polymer has an inherent viscosity of about 0.55 to 1.2 measured at 30° C.

2. The selective permeable membrane of claim 1, wherein the polyimide polymer has an inherent viscosity of about 0.60 to about 1.00 measured at 30° C.

3. The selective permeable membrane of claim 1, wherein R is an organic group containing an aromatic ring.

4. The selective permeable membrane of claim 1, wherein R is an organic group containing a hydrophilic group.

5. The selective permeable membrane of claim 1, wherein R is an organic group containing an aromatic ring and hydrophilic group.

6. The selective permeable membrane of claim 1, wherein said membrane comprises a skin layer and a porous layer, wherein the pore size of the skin layer does not exceed the pore size of the porous layer.

7. The selective permeable membrane of claim 1, wherein the number of repeating units in said polymer is about 60 to 300.

8. The selective permeable membrane of claim 1, wherein said polymer has a molecular weight of about 20,000 to 120,000.

9. The selective permeable membrane of claim 1, wherein imide linking groups comprise at least about 70% of all of the linking groups of the polyimide polymer.

10. The selective permeable membrane of claim 9, wherein imide linking groups comprise at least 90% of all of the linking groups of the polyimide polymer.

11. The selective permeable membrane of claim 10, wherein imide linking groups comprise from 98 to 100% of all of the linking groups of the polyimide polymer.

* * * * *